(12) United States Patent
Kobayashi et al.

(10) Patent No.: US 6,817,267 B2
(45) Date of Patent: Nov. 16, 2004

(54) ACTUATOR HAVING A WAVE GEAR REDUCTION DRIVE

(75) Inventors: Yukitoshi Kobayashi, Nagano-ken (JP); Kunio Miyashita, Nagano-ken (JP); Toshiki Maruyama, Nagano-ken (JP); Yoshikazu Yajima, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/076,342

(22) Filed: Feb. 19, 2002

(65) Prior Publication Data

US 2002/0135241 A1 Sep. 26, 2002

(30) Foreign Application Priority Data

Feb. 19, 2001 (JP) ......................................... 2001-041789

(51) Int. Cl.[7] .............................................. F16H 35/00
(52) U.S. Cl. ......................................................... 74/640
(58) Field of Search ............................................ 74/640

(56) References Cited

U.S. PATENT DOCUMENTS

| 4,491,033 | A | * | 1/1985 | Carlson et al. ................. 74/640 |
| 4,620,830 | A | * | 11/1986 | Tsuchihasi et al. ........ 74/640 X |
| 4,756,203 | A | * | 7/1988 | Matsuda .................... 74/640 X |
| 4,770,059 | A | * | 9/1988 | Beyer ........................... 74/640 |
| 4,819,975 | A | * | 4/1989 | Morishita et al. ......... 74/640 X |
| 5,984,048 | A | * | 11/1999 | Kiyosawa et al. ........ 74/640 X |
| 6,258,007 | B1 | * | 7/2001 | Kristjansson .............. 74/640 X |

FOREIGN PATENT DOCUMENTS

| JP | 358162774 | * | 9/1983 | .................. 74/640 |
| JP | 359166747 | * | 9/1984 | .................. 74/640 |
| JP | 360098246 | * | 6/1985 | .................. 74/640 |
| JP | 360098247 | * | 6/1985 | .................. 74/640 |
| JP | 11-014656 | | 1/1999 | |

* cited by examiner

Primary Examiner—Ha Ho
(74) Attorney, Agent, or Firm—Burns, Doane, Swecker & Mathis, L.L.P.

(57) ABSTRACT

An actuator has a housing, a motor and a wave gear reduction drive arranged axially in the housing, and a rotational shaft extending through the centers of these portions. The rotational shaft is supported at its rear side by a first bearing and at its front side by a boss of a flexible external gear of the wave gear reduction drive via a second bearing. The rotational shaft is formed integrally on its outer peripheral portion with a cam plate of a wave generator of the wave gear reduction drive. The actuator thus configured does not require a coupling mechanism between the motor and the wave gear reduction drive and needs fewer bearings to support the rotational shaft, making it possible to reduce the axial length of the actuator.

10 Claims, 2 Drawing Sheets

ACTUATOR HAVING A WAVE GEAR REDUCTION DRIVE

This application claims priority under 35 U.S.C. §§ 119 and/or 365 to JP 2001-041789 filed in Japan on 19 Feb. 2001; the entire content of which is hereby incorporated by reference.

BACKGROUND OF THE INVENTION

1. Field of the Invention

The present invention relates to an actuator having a wave gear reduction drive, particularly to an actuator having a structure that enables the axial length of the actuator to be reduced.

2. Description of the Prior Art

Actuators include a motor and reduction gear and are configured to reduce the speed of the motor rotation by a prescribed reduction ratio to effect linear or rotational movement of a load. Normally the motor rotation is transmitted to the reduction gear by coupling the motor output shaft to the input shaft of the reduction gear. A wave gear reduction drive is a reduction gear that has few parts and is capable of providing a high reduction ratio. A wave gear reduction drive is comprised of three components, which are a rigid, circular internal gear, a flexible, circular external gear, and a wave generator that constitutes the input element. Thus, in the case of an actuator equipped with a wave gear reduction drive, the motor shaft is connected to the wave generator by a coupling.

An actuator thus equipped with a wave gear reduction drive tends to have a long axis, since the wave gear reduction drive is disposed in the axial direction of the actuator.

SUMMARY OF THE INVENTION

An object of the invention is therefore to provide a configuration for an actuator having a wave gear reduction drive that enables the length of the axis thereof to be decreased.

In accordance with the present invention, the above object is attained by an actuator comprising a housing and a motor and wave gear reduction drive disposed adjacently within the housing along the center axis of the housing, the wave gear reduction drive including a circular, rigid internal gear, a circular, flexible external gear that is capable of radial elastic displacement, and a wave generator that radially displaces the flexible external gear into partial engagement with the rigid internal gear while circumferentially rotating points of the partial engagement, the flexible external gear including a cylindrical body portion that is capable of radial elastic displacement, an annular diaphragm that extends radially inward or outward from an end of the body portion, and a boss formed as a continuous part of an inner or outer edge of the diaphragm, the wave generator including a rigid cam plate and a bearing with internal and outer rings capable of radial elastic displacement disposed on the peripheral surface of the cam plate, with the cam plate being driven to rotate by the motor, the motor having a rotational shaft that includes a motor shaft portion to which a rotor is attached and an extended shaft portion that extends from an end of the motor shaft portion towards the wave gear reduction drive, the wave generator cam plate being formed integrally on the peripheral surface of the extended shaft portion, and, sandwiching the portion at which the cam plate is integrally formed, the motor shaft portion of the rotational shaft being rotatably supported in the housing via a first bearing, and the wave gear reduction drive end of the rotational shaft being rotatably supported by the flexible external gear boss via a second bearing.

In the actuator of this invention, the motor shaft and the cam plate are formed from the rotational shaft, which is a single component, and the rotational shaft is supported by first and second bearings. The first bearing can be a typical support type with a fixed outer ring and a rotating inner ring, while in the case of the second bearing the outer ring is affixed to the boss of the flexible external gear that is the rotational output element of the actuator, and the inner ring is affixed to the rotational shaft extension portion, so that both rings are supported in a state of differential rotation.

An actuator thus configured in accordance with the present invention can be made with a shorter axial length than a conventional actuator in which the motor, coupling and reduction gear are all connected in the axial direction.

In a typical actuator, an internal partition separates the housing into the space where the motor is located and the space where the wave gear reduction drive is located. In such a case, the inside face of a central opening formed in the partition can be used to rotatably support the rotating shaft via the first bearing. In this case, a single member can be used to integrally form the rigid internal gear and the partition. This would eliminate the need to use screws to assemble the two parts, and by eliminating the step of joining the two parts together, would make it possible to decrease the number of assembly steps required. This would also ensure enough space for the motor's windings.

In a typical wave gear reduction drive, the flexible external gear has the annular diaphragm that extends radially inward from the end of the body portion, and a cup-shaped boss formed as a continuous part of the inner edge of the diaphragm. In this case, the second bearing can be supported by an annular bearing seat attached to the boss. Moreover, a typical motor has an encoder attached to the motor shaft, with the motor being controlled based on the encoder output. In this case, the rotational shaft can be provided with a second extended shaft portion, formed to extend from the other end of the motor shaft portion, and the encoder can be attached to the second extended shaft portion. A hollow actuator can be formed by using a hollow rotational shaft and providing the flexible external gear boss with a through-hole that is concentric with the hollow shaft.

BRIEF DESCRIPTION OF THE DRAWINGS

The above and other objects and advantages of the invention will be more apparent from the following description and drawings, in which.

DESCRIPTION OF THE PREFERRED EMBODIMENT

Examples of the actuator having a wave gear reduction drive according to the invention will now be described with reference to the drawings.

Figure 1:
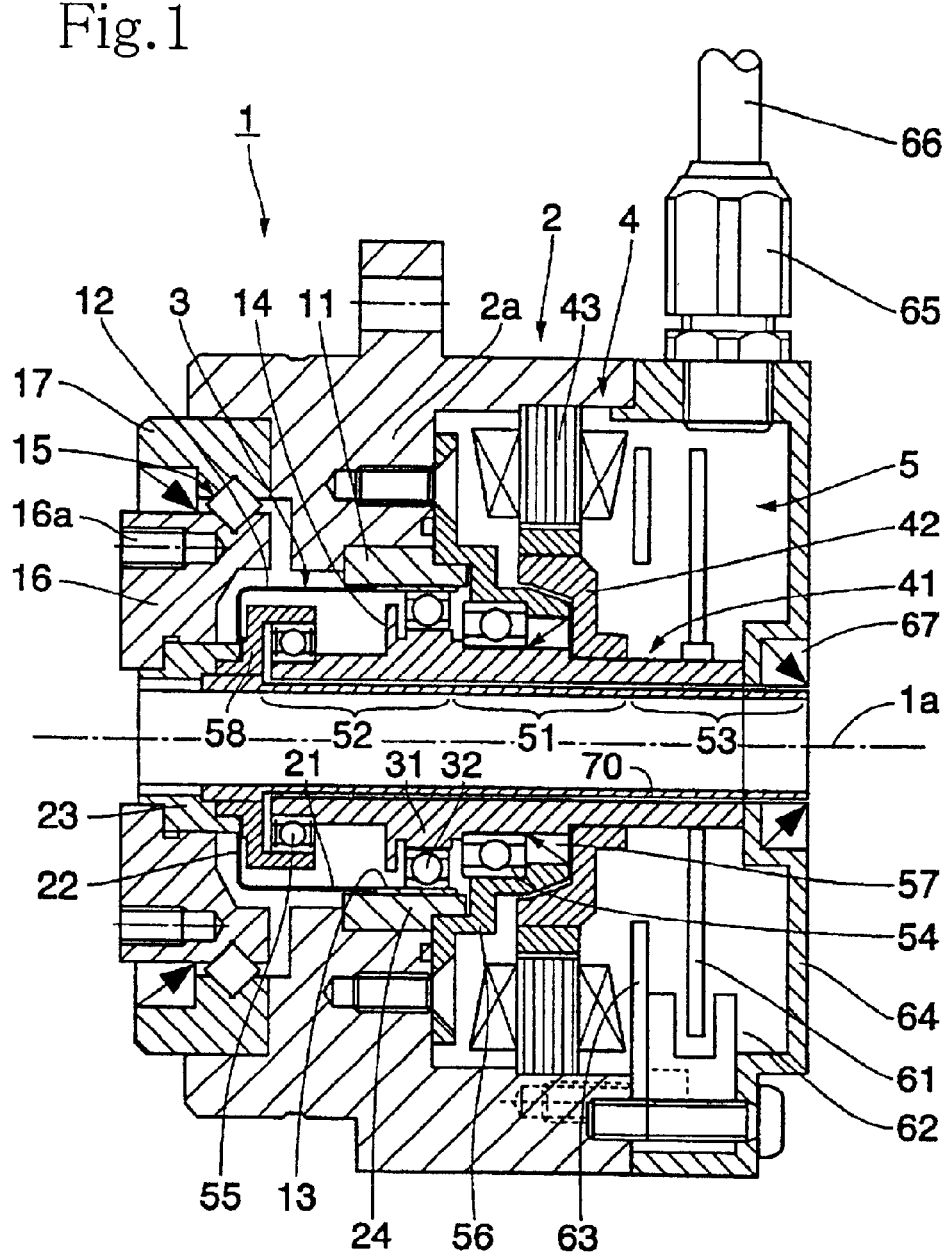
FIG. 1 is a longitudinal cross-sectional diagram of a hollow actuator equipped with a wave gear reduction drive according to this invention.

FIG. 1 is a longitudinal cross-sectional diagram of an actuator according to the invention. An actuator 1 comprises a cylindrical housing 2 and, disposed along the central axis 1a inside the housing 2, from the output end, a wave gear reduction drive 3, a motor 4 and an encoder 5, in that order.

The wave gear reduction drive 3 includes a circular rigid internal gear 11, a cup-shaped flexible external gear 12 that is capable of radial elastic displacement, and a wave generator 14 that radially displaces the flexible external gear 12 into partial engagement with internal teeth 13 of the rigid internal gear 11 while circumferentially rotating the points of the partial engagement.

The flexible external gear 12 has a cylindrical body portion 21, a cylindrical diaphragm 22 extending radially inwards from one end of the body portion 21, an annular boss 23 formed as a continuous part of the diaphragm 22, and external teeth 24 formed on the peripheral outer surface at the other end of the body portion 21. The wave generator 14 includes a rigid cam plate 31, a bearing 32 having inner and outer rings capable of radial elastic displacement disposed on the peripheral surface of the cam plate 31. The cam plate 31 has an elliptical shape and, via the bearing 32, is mounted inside the part of the body portion 21 where the external teeth 24 are located. Thus, the portion of the flexible external gear 12 with the external teeth 24 is flexed into an ellipsoid, causing externally toothed portions at each end of the elliptical major-axis to mesh with internally toothed portions of the rigid internal gear 11.

The cam plate 31 constitutes a reduction gear input element that is rotated by the motor 4. When the speed of cam plate 31 rotation is elevated, the points of engagement between the flexible external gear 12 and rigid internal gear 11 move circumferentially. There are 2n (where n is a positive integer) fewer external teeth 24 than internal teeth 13. Normally, the difference is set at two fewer teeth. The difference in the number of teeth sets up a relative rotation between the flexible external gear 12 and the rigid internal gear 11.

The rigid internal gear 11 is affixed to an annular flange 2a formed on the inside surface of the housing 2. The flexible external gear 12 is rotatably supported by means of the boss 23, via a cross-roller bearing 15. A ball bearing can be used in place of a cross-roller bearing. Thus, a reduced-speed rotation is output via the flexible external gear 12. That is, the inner ring 16 to which the boss 23 is affixed is provided with a hole 16a for attaching a load (not shown). The reduced-speed rotation is output via the inner ring 16. The reduction principle of the wave gear reduction drive 3 is publicly known, so further explanation thereof is omitted. As shown in the drawing, the inner ring 16 and outer ring 17 of the cross-roller bearing 15 also function as sealing members that seal the output-end opening of the housing 2.

The motor 4 has a rotational shaft 41, a rotor 42 attached to the peripheral surface of the rotational shaft 41, and a stator 43 disposed around the rotor 42, with a fixed gap therebetween. The stator 43 is attached to the inside surface of the housing 2. The rotational shaft 41 has a motor shaft portion 51 to which the rotor 42 is affixed, a front-end shaft extension 52 extending towards the wave gear reduction drive 3 from one end of the motor shaft portion 51, and a rear-end shaft extension 53 that extends in the opposite direction from the other end of the motor shaft portion 51.

The cam plate 31 is formed integrally on the peripheral surface of the front-end shaft extension 52. In other words, the motor rotational shaft and the cam plate are formed from a single member. Sandwiching the portion at which the cam plate 31 is integrally formed, the motor shaft portion 51 of the rotational shaft 41 is rotatably supported in the housing 2 via a first bearing (motor shaft bearing) 54, and the wave gear reduction drive 3 end of the rotational shaft 41 is rotatably supported by the flexible external gear boss 23 via a second bearing (wave generator bearing) 55.

Inside the housing 2, there is a circular partition 56 separating the motor 4 installation space from the wave gear reduction drive 3 installation space. The peripheral part of the partition 56 is affixed to the annular face of the housing attachment flange 2a. The first bearing 54 is disposed in the central opening of the partition 56. There is an adjacent seal 57 between the wave gear reduction drive end and the motor end. The front-end shaft extension 52 of the rotational shaft 41 is inserted into the inner ring of the second bearing 55 and the outer ring is held in bearing holder 58. The bearing holder 58 is affixed in the boss 23.

The rotary encoder 5 has a slit plate 61 affixed to the rear-end shaft extension 53, and a photosensor 62 comprised by a light-emitting element and a light-receiving element positioned in opposition at each side of the slit. There is a partition 63 between the encoder 5 and the motor 4. The opening at the rear end of the housing 2 is protected by a cover. The cover 64 has a connector 65 for power wiring and for wiring to carry out the encoder output via the outside line 66. There is a seal 67 around the central opening in the cover 64, via which the end of hollow output shaft 70 rotatably disposed inside the hollow interior of the rotational shaft 41 is exposed. The other end of the hollow output shaft 70 is fixed to the boss 23 of the flexible external gear 12.

In the actuator 1 thus configured, the motor rotational shaft and the wave generator are an integrated unit. That is, the cam plate 31 is integrally formed on the peripheral surface of the front-end shaft extension 52. Also, the rotational shaft 41 is rotatably supported by the first and second bearings 54 and 55. The first bearing 54 can be a typical support type bearing in which the outer ring is fixed and the inner ring rotates. However, in the case of the second bearing 55, the inner ring is coupled to the rotational shaft 41 that rotates at high speed, while the outer ring is coupled to the boss 23 of the flexible external gear 12 that rotates at a reduced speed. This results in a rotation differential between the inner and outer rings.

Since the rotational shaft 41 on which the cam plate 31 is integrally formed is supported by the two bearings 54 and 55, the need for a coupling mechanism is eliminated. Moreover, compared to configurations that do include a coupling mechanism, it is possible to decrease the number of bearings that support rotating members. In addition, the rotor and encoder can be compactly mounted on the rear-end portion of the rotational shaft 41. Thus, an actuator with a shorter axial length can be realized.

While the rotational shaft has been described with reference to a hollow shaft, a solid rotational shaft can of course be used.

Figure 2:
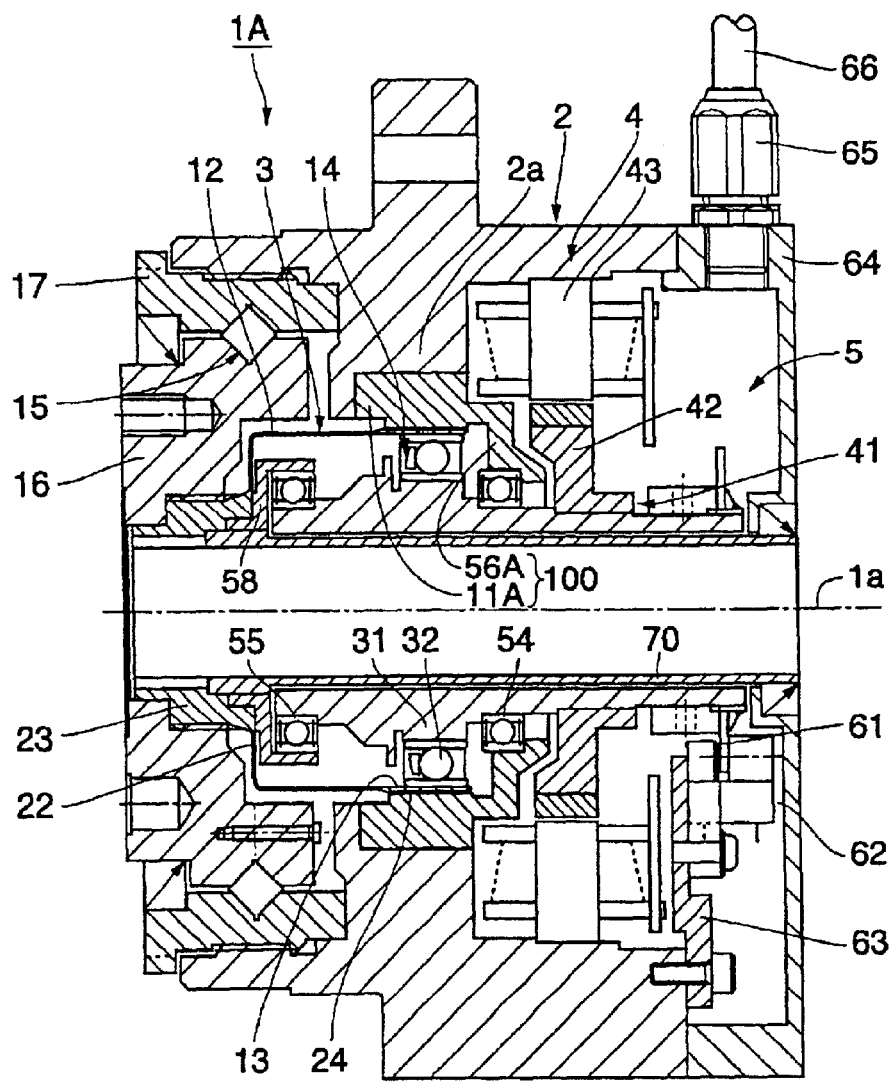
FIG. 2 is a longitudinal cross-sectional diagram of a variation of the actuator of FIG. 1.

FIG. 2 shows the cross-section of an actuator 1A that is a variation of the actuator of the above embodiment. The basic structure is the same, so corresponding portions have been given the same reference numbers, and only the differences will be described. In the case of actuator 1A, instead of using a separate partition 56 as in the first embodiment, the rigid internal gear and bearing housing are affixed as a single, integrated member. That is, an annular bearing housing portion 56A extends from the circular end surface of the rigid internal gear 11A towards the center, and the outer ring of the ball-bearing 54 and the seal 57 being supported by the inside surface of the bearing housing portion 56A.

Using a single member 100 that integrates the rigid internal gear 11A and the bearing housing portion 56A eliminates the need for screws that would otherwise be needed to fix the two members together, thereby also decreasing the number of assembly steps that are required.

This would also ensure enough space for the motor's windings, since less space would be required to house the rigid internal gear and bearing housing portion.

As described in the foregoing, in the actuator having a wave gear reduction drive according to this invention, the rotational shaft of the motor is integrated with the wave generator of the wave gear reduction drive. Also, one end of the shaft is rotatably supported on the housing side via a bearing, while the other end of the shaft is rotatably supported, via a bearing, by the boss of the flexible external gear of the wave gear reduction drive. The actuator according to this invention does not require a coupling mechanism between the motor and the wave gear reduction drive and needs fewer bearings to support the rotational shaft, making it possible to reduce the axial length of the actuator.

What is claimed is:

1. An actuator, comprising:

a housing and a motor and wave gear reduction drive disposed adjacently within the housing along a center axis of the housing;

the wave gear reduction drive including a circular, rigid internal gear, a circular, flexible external gear that is capable of radial elastic displacement, and a wave generator that radially displaces the flexible external gear into partial engagement with the rigid internal gear while circumferentially rotating portions of the partial engagement;

the flexible external gear including a cylindrical body portion that is capable of radial elastic displacement, an annular diaphragm that extends radially inward or outward from an end of the body portion, and a boss formed as a continuous part of an inner or outer edge of the diaphragm, the boss provided with a through-hole;

the wave generator including a rigid cam plate and a wave bearing within inner and outer rings capable of radial elastic displacement disposed on the peripheral surface of the cam plate, with the cam plate being driven to rotate by the motor;

the motor having a rotational hollow shaft that includes a motor shaft portion to which a rotor is attached and an extended shaft portion that extends from an end of the motor shaft portion towards the wave gear reduction drive, the wave generator cam plate being formed integrally on the peripheral surface of the extended shaft portion;

sandwiching the portion at which the cam plate is integrally formed, the motor shaft portion of the rotational shaft being rotatably supported in the housing via a first bearing, and the wave gear reduction drive end of the rotational shaft being rotatably supported by the flexible external gearboss via a second bearing;

the through-hole of the flexible external gear boss being concentric with the hollow shaft;

an output shaft being mounted to the flexible external gear boss and rotatably located inside the hollow rotational shaft of the motor and rotatably supported in the housing via a cross roller bearing, the cross roller bearing being located in axial alignment with the diaphragm and the flexible external gear boss such that the cross roller bearing is located externally of the diaphragm and the flexible external gear boss; and the cross roller bearing, the second bearing, the wave bearing, and the first bearing located in this order from a side of the wave gear reduction drive along the center axis of the housing.

2. The actuator according to claim 1, wherein an internal partition separates the housing into a space where the motor is installed and a space where the wave gear reduction drive is installed.

3. The actuator according to claim 2, wherein the rigid internal gear and partition are an integrally formed single component.

4. The actuator according to claim 1, wherein the flexible external gear is of a cup shape having the annular diaphragm that extends radially inward from an end of the body portion and the boss that is formed as a continuous part of the inner edge of the diaphragm, and the second bearing is supported by an annular bearing holder attached to the boss.

5. The actuator according to claim 1, wherein the rotational shaft has a second extended shaft portion that extends from the other end of the motor shaft portion, with an encoder being attached to the second extended shaft portion.

6. The actuator according to claim 1, wherein the output shaft is accessible from both axial ends of the actuator.

7. The actuator according to claim 1, further comprising a stator, wherein the rigid internal gear and the stator are fixed to the housing.

8. The actuator according to claim 7, wherein the rigid internal gear and the stator are fixed to a common portion of the housing.

9. The actuator according to claim 1, wherein the cross roller bearing is arranged axially external of the second bearing.

10. The actuator according to claim 9, wherein the cross roller bearing is not in radial alignment with the second bearing.

* * * * *